United States Patent [19]

Randall, Jr.

[11] 4,146,439

[45] Mar. 27, 1979

[54] ANODIZATION OF ALUMINUM CAPACITOR ELECTRODE FOIL

[75] Inventor: John J. Randall, Jr., Williamstown, Mass.

[73] Assignee: Sprague Electric Company, North Adams, Mass.

[21] Appl. No.: 905,709

[22] Filed: May 15, 1978

[51] Int. Cl.$^2$ .......................................... C25D 11/06
[52] U.S. Cl. .................................. 204/14 N; 204/58
[58] Field of Search ...................... 204/14 R, 14 N, 58

[56] References Cited

U.S. PATENT DOCUMENTS

| 1,963,049 | 6/1934 | Georgiev | 361/433 |
| 2,017,835 | 10/1935 | Georgiev | 29/570 |
| 2,052,575 | 9/1936 | Lilienfeld | 204/37 R |
| 2,094,048 | 9/1937 | Siegel | 204/37 R |
| 3,796,644 | 3/1974 | Bernard | 204/58 |

FOREIGN PATENT DOCUMENTS 676296 12/1963 Canada.

*Primary Examiner*—T. M. Tufariello
*Attorney, Agent, or Firm*—Connolly and Hutz

[57] ABSTRACT

Current efficiency is increased in the anodization of aluminum foil for electrolytic capacitors by carrying out the anodization below 90° C. in a non-aqueous ethylene glycol-ammonium pentaborate bath containing a small amount of an orthophosphate source, e.g., ammonium dihydrogen phosphate.

3 Claims, No Drawings

ANODIZATION OF ALUMINUM CAPACITOR ELECTRODE FOIL

BACKGROUND OF THE INVENTION

This invention relates to the anodization of aluminum foil, particularly for use in electrolytic capacitors. Even more particularly, it relates to an anodization electrolyte which reduces the electric charge requirements compared to conventional formation electrolytes.

The formation of dielectric barrier oxide films on aluminum foil for capacitors is known generally. These films are non-porous and quite thin ($10^{-7}$m). Generally, aqueous anodization electrolytes have been used for the anodization of aluminum, e.g., aqueous borate, phosphate, or citrate electrolytes. The use of non-aqueous electrolytes has been restricted usually to post-formation electrolytes, fill electrolytes for capacitors, or very specialized processes. Aqueous electrolytes are generally preferred since the solvent, water, is so much less expensive. Film quality also has been better when aqueous electrolytes have been used.

The industry always has been looking for ways to reduce electrical power consumption. A known way of doing this has been to anodize aluminum through a porous hydrated layer on its surface. However, hydrate formation cannot be used for low-volt anodization as fine pores become blocked. The search for means to reduce power consumption has intensified as energy costs have increased.

SUMMARY OF THE INVENTION

It is an object of the invention to provide an anodization process having increased current efficiency for aluminum electrolytic capacitor foil compared to conventional aqueous anodization processes.

It is another object of the invention to provide an anodization electrolyte in which formation rate is increased.

It is a further object of the invention to provide an electrolyte bath containing phosphate that eliminates the formation of aluminum phosphate precipitate in the bath.

The above objects can be achieved by anodizing aluminum in a non-aqueous glycol-borate electrolyte to which a small amount of a soluble orthophosphate salt or a compound which produces orthophosphate ions in the glycol-borate electrolyte solution has been added. This addition gives film properties comparable to those obtained with aqueous electrolytes and superior to those obtained with a straight glycol-borate electrolyte. The anodization is suitably carried out below 90° C.

DESCRIPTION OF THE PREFERRED EMBODIMENTS

The anodization process of the present invention uses a glycol-borate-based electrolyte which by itself gives a 5-10% increase in charge efficiency, as shown by W. J. Bernard and J. W. Cook, *J. Electrochem. Soc.* 106:643-6(1959), i.e., a greater amount of oxide film formed per coulomb, compared to aqueous electrolytes. With the addition of a small amount of an orthophosphate compound, e.g., orthophosphoric acid, mono- or di-basic phosphate such as ammonium dihydrogen phosphate or diammonium hydrogen phosphate, or other source of orthophosphate ion, to the glycol-borate electrolyte, a further 25% increase in charge efficiency is realized. This charge saving (30-35%) over conventional aqueous formation electrolytes is realized by producing a thicker barrier oxide film for the same amount of charge. As will be seen below, the glycol-borate-orthophosphate system gave a greater charge efficiency and greater weight gain than did glycol-borate alone. However, both systems produced the same CV product. Since the dielectric properties appear the same as for pure aluminum oxide, $Al_2O_3$, known to be formed in pure glycol-borate systems, (Bernard et al., op cit), one way of interpreting such results is that the dielectric film obtained with the present electrolyte is likely to be an aluminum oxyphosphate. This may explain also the fact that aluminum phosphate precipitate, common with aqueous phosphate-containing electrolytes, did not form.

In the examples below, formation of various aluminum foils in glycol-borate electrolytes, with and without an orthophosphate, is shown. The orthophosphate used is ammonium dihydrogen phosphate to permit direct comparison to a conventional aqueous ammonium dihydrogen phosphate formation electrolyte.

EXAMPLE 1

In this example, anodization was carried out to the same film voltage as obtained with a standard aqueous ammonium dihydrogen phosphate at 90° C. The experimental formation electrolyte consisted of 17 wt% ammonium pentaborate in ethylene glycol (referred to as base) plus the addition of 2 wt% ammonium dihydrogen phosphate (ADP). Time is the time to reach required voltage, leakage is expressed as $\mu A/1.36 \text{ in}^2$ and represents the current passing 5 min after voltage is achieved, and capacitance is expressed as $\mu F/1.36 \text{ in}^2$.

Table 1

| Formation Temp. | Electrolyte | Time (min) | Leakage | Capacitance |
|---|---|---|---|---|
| 90° C. | Aqueous ADP | 3.0-3.7 | 35.1 | 50.9 |
| 25° C. | Base | 2.34 | 83 | 56.4 |
| 25° C. | Base + ADP | 2.24 | 27 | 55.4 |

The glycol-borate electrolyte alone gave unacceptable leakage current while capacity is acceptable while that with the orthophosphate gave acceptable values for both. Thus, the addition of ADP to glycol-borate gave results equivalent to conventional aqueous ADP.

EXAMPLE 2

This example shows the effect of the presence of water in the formation electrolyte.

Table 2

| Formation Temp. | Electrolyte | Time (min) | Leakage | Capacitance |
|---|---|---|---|---|
| 90° C. | Aqueous ADP | 1.59 | 3.1 | 26.1 |
| 90° C. | Base + ADP | 1.74 | 28.3 | 26.9 |
| 90° C. | Base, ADP + 20% water | 1.77 | 1.0 | 19.4 |
| 25° C. | Base + ADP | 1.01 | 17.8 | 25.9 |
| 25° C. | Base, ADP + 20% water | 1.59 | 4.2 | 24.4 |

The presence of water improved leakage current but at the expense of anodization efficiency at both temperatures. The best anodization efficiency was obtained at 25° C. with the orthophosphate additive.

EXAMPLE 3

Anodization of both etched and unetched foil was investigated using the experimental electrolyte of Example 1 at 85° C. Both anodized at approximately the same rate to about 200V. At that point, anodization of the unetched foil leveled off while the etched foil could be anodized to higher voltages.

By way of comparison, the average formation rate, 0–200V, for two glycol-borate electrolytes with and without 0.2 wt% ADP is shown for unetched foil at two other current densities, 0.1 mA/cm$^2$ and 1.0 mA/cm$^2$, at 85° C. Electrolyte A is the same as above, 17 wt% ammonium pentaborate in ethylene glycol, while electrolyte B is 33 wt% ammonium pentaborate in ethylene glycol.

Table 3

| Electrolyte | Ave. Formation rate, V/min | |
|---|---|---|
| | 0.1 mA/cm$^2$ | 1.0 mA/cm$^2$ |
| A | 1.6 | 19.8 |
| A + ADP | 2.4 | 25.8 |
| B | 1.8 | 19.8 |
| B + ADP | 2.3 | 25.2 |

This shows the faster formation rate, and hence decreased charge passage for a given voltage, for glycol-borate electrolytes containing 0.2 wt% ammonium dihydrogen phosphate.

EXAMPLE 4

This example shows formation voltage and weight gain (mg/100 cm$^2$) versus time using 20 wt% ammonium pentaborate in ethylene glycol with and without 0.2% ammonium dihydrogen phosphate on unetched foil at 25° C. and 1 mA/cm$^2$ current density.

Table 4

| t(sec) | Glycol-borate | | Glycol-borate-ADP | |
|---|---|---|---|---|
| | Voltage | Wt gain | Voltage | Wt gain |
| 100 | 54 | 0.85 | 62 | 1.04 |
| 200 | 102 | 1.02 | 122 | 1.22 |
| 300 | 152 | 2.1* | 180 | 2.56* |
| 400 | 199 | — | 230 | — |
| 500 | 244 | — | 251 | — |
| dV/dt (V/sec) | 0.49 | — | 0.59 | — |
| ave wt gain (mg/100 sec) | — | 0.84 | — | 1.03 |

*at 250 sec

Thus, the presence of an orthophosphate permited anodization to a higher voltage than glycol-borate at the same current density and time. To state this another way, the average anodization rate is faster at the same current density when the orthophosphate is present so the total charge passed is less.

What is claimed is:

1. A process for anodizing aluminum foil comprising anodizing aluminum capacitor electrode foil at below 90° C. in a non-aqueous electrolyte bath of ethylene glycol, ammonium pentaborate, and 0.2 wt% of an orthophosphate source compound to produce a non-porous barrier layer on said foil.

2. A process according to claim 1 wherein 20 wt% ammonium pentaborate is used, and said orthophosphate source compound is ammonium dihydrogen phosphate.

3. A process according to claim 1 wherein said anodization is carried out at about 25° C.

* * * * *